US012658424B2

(12) United States Patent
Lee et al.

(10) Patent No.: US 12,658,424 B2
(45) Date of Patent: Jun. 16, 2026

(54) POSITIVE ELECTRODE ACTIVE MATERIAL FOR LITHIUM SECONDARY BATTERY AND METHOD OF PREPARING THE SAME

(71) Applicant: POSTECH ACADEMY-INDUSTRY FOUNDATION, Pohang-si (KR)

(72) Inventors: Jung-wha Lee, Gumi-si (KR); Byoung-woo Kang, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 307 days.

(21) Appl. No.: 16/956,659

(22) PCT Filed: Dec. 28, 2018

(86) PCT No.: PCT/KR2018/016825
§ 371 (c)(1),
(2) Date: Jun. 22, 2020

(87) PCT Pub. No.: WO2019/132568
PCT Pub. Date: Jul. 4, 2019

(65) Prior Publication Data
US 2020/0321610 A1 Oct. 8, 2020

(30) Foreign Application Priority Data

Dec. 29, 2017 (KR) ........................ 10-2017-0184585

(51) Int. Cl.
H01M 4/36 (2006.01)
H01M 4/02 (2006.01)
(Continued)

(52) U.S. Cl.
CPC ......... H01M 4/364 (2013.01); H01M 4/0471 (2013.01); H01M 4/485 (2013.01);
(Continued)

(58) Field of Classification Search
CPC .... H01M 4/364; H01M 4/0471; H01M 4/485; H01M 4/505; H01M 4/525
See application file for complete search history.

(56) References Cited

U.S. PATENT DOCUMENTS

2009/0104531 A1* 4/2009 Tanino ................. H01M 4/136
429/223
2009/0297947 A1 12/2009 Deng et al.
(Continued)

FOREIGN PATENT DOCUMENTS

EP     3 118 916     1/2017
EP     2 660 907     9/2018
(Continued)

OTHER PUBLICATIONS

Cahill, L.S., S.-C. Yin, A. Samoson, I. Heinmaa, L.F. Nazar, G.R. Goward. "6Li NMR Studies of Cation Disorder and Transition Metal Ordering in Li[Ni1/3Mn1/3Co1/3]O2 Using Ultrafast Magic Angle Spinning", Chem. Mater., vol. 17, No. 26, Nov. 22, 2005 , p. 6560-6566 (Year: 2005).*
(Continued)

*Primary Examiner* — Haroon S. Sheikh
(74) *Attorney, Agent, or Firm* — LEX IP MEISTER, PLLC

(57) ABSTRACT

The present invention relates to a positive electrode active material for a lithium secondary battery, which includes two types of layered structure materials and may improve properties by controlling an optimum cation (lithium and transition metals) distribution capable of increasing activity of oxygen ions, as anions, in the layered structure materials, and a method of preparing the same.

3 Claims, 8 Drawing Sheets

(51) Int. Cl.
    *H01M 4/04*          (2006.01)
    *H01M 4/485*        (2010.01)
    *H01M 4/505*        (2010.01)
    *H01M 4/525*        (2010.01)

(52) U.S. Cl.
    CPC ........... *H01M 4/505* (2013.01); *H01M 4/525* (2013.01); *H01M 2004/028* (2013.01)

(56) References Cited

U.S. PATENT DOCUMENTS

| | | | |
|---|---|---|---|
| 2012/0034503 A1 | 2/2012 | Toyama et al. | |
| 2012/0043500 A1* | 2/2012 | Xiang | C01G 51/50 |
| | | | 252/182.1 |
| 2013/0244105 A1* | 9/2013 | Chang | H01M 10/0525 |
| | | | 429/211 |
| 2015/0111105 A1 | 4/2015 | Kato et al. | |
| 2016/0013470 A1* | 1/2016 | Paulsen | H01M 10/054 |
| | | | 252/182.1 |
| 2016/0190559 A1* | 6/2016 | Hou | C01G 45/1257 |
| | | | 429/231.95 |
| 2019/0088940 A1* | 3/2019 | Ceder | C01G 53/44 |

FOREIGN PATENT DOCUMENTS

| | | |
|---|---|---|
| KR | 20140043320 | 4/2014 |
| KR | 20170079942 | 7/2017 |
| KR | 20170100534 | 9/2017 |
| TR | 201504382 | 1/2016 |

OTHER PUBLICATIONS

Jihyun Hong et al., "Structural evolution of layered Li1.2Ni0.2Mn0.6O2 upon electrochemical cycling in a Li rechargeable battery", J. Mater. Chem., 20, 10179-10186, Oct. 4, 2010.

Jun Wang et al., "Synthesis and electrochemical properties of layered lithium transition metal oxides", J. Mater. Chem., 21, 2544-2549, Dec. 23, 2010.

Anirudha Jena et al., "Capacity Enhancement of the Quenched Li—Ni—Mn—Co Oxide High-voltage Li-ion Battery Positive Electrode", Electrochimica Acta vol. 236, 10-17, May 10, 2017.

* cited by examiner

| Neutron | I(~66°)/I(~68°) | I(~82°)/I(~83°) |
|---|---|---|
| EXAMPLE 2 | 0.993 | 1.297 |
| EXAMPLE 1 | 0.999 | 1.384 |
| TYPICAL PROCESS | 1.169 | 1.872 |

| Neutron refinement (Ni in Li layer) | LNMO phase | $Li_2MnO_3$ phase |
|---|---|---|
| EXAMPLE 2 | 5.8% | 11.7% |
| EXAMPLE 1 | 5.4% | 9.1% |
| TYPICAL PROCESS | 4.8% | 0.0% |

FIG.7

|  | EXAMPLE 1 | | TYPICAL PROCESS | |
|---|---|---|---|---|
|  | ppm | I(%) | ppm | I(%) |
| $Li_{Li}$ in $Li_2MnO_3$ | 690 | 39 | 714 | 57 |
| $Li_{TM}$ in $Li_2MnO_3$ | 1426 | 14 | 1443 | 14 |
| $Li_{Li}$ in LNMO | 524 | 31 | 534 | 17 |
| $Li_{TM}$ in LNMO | 1212 | 16 | 1259 | 12 |
| DIFFERENCE OF Li RATIO IN EACH LAYERED STRUCTURE | 0.06 | | 0.42 | |

POSITIVE ELECTRODE ACTIVE MATERIAL FOR LITHIUM SECONDARY BATTERY AND METHOD OF PREPARING THE SAME

TECHNICAL FIELD

The present invention relates to a method of preparing a positive electrode active material for a lithium secondary battery and a positive electrode active material for a lithium secondary battery, and more particularly, to a method of preparing a positive electrode active material for a lithium secondary battery, which is to synthesize by controlling an optimum cation (lithium and transition metals) distribution capable of increasing activity of particularly oxygen ions, as anions, by significantly increasing reversible electrochemical activity of a layered structure material, and a positive electrode active material for a lithium secondary battery.

BACKGROUND ART

Recently, since eco-friendly vehicles and large-capacity energy storage systems have rapidly developed with the development of electric, electronic, telecommunication, and computer industries, development of a lithium secondary battery with high energy capacity and low cost as well as high safety is becoming very important in lithium-ion battery market. Particularly, in order to use a lithium secondary battery to a medium and large-sized device such as an electric vehicle, it is becoming increasingly important to develop a positive electrode material which influences performance of the battery according to energy density and determines overall cost.

As positive electrode active materials that have been extensively studied to date, there are mainly $LiCoO_2$ (lithium cobalt oxide, LCO)-based active materials having a layered structure, and, in addition, use of $LiNiO_2$ (lithium nickel oxide, LNO) with a layered crystal structure and a lithium-containing manganese oxide of $LiMnO_2$ (lithium manganese oxide, LMO) has been considered. Since the above-described positive electrode active materials structurally have a layered structure, the structure collapses when a large amount of lithium is deintercalated under high capacity to cause a problem in terms of reversibility and safety, and thus, these positive electrode active materials are disadvantageous in that they are not suitable for an electric vehicle that uses a large-capacity battery.

In addition to the structural problem, the $LiNiO_2$-based positive electrode active material is relatively inexpensive and may achieve high discharge capacity, but it has a problem that energy capacity is reduced because reversibility is reduced due to a change in the crystal structure through phase transition or other distortion during charge and discharge cycles and has a problem that electrochemical performance is degraded when the material is exposed to air and moisture. Also, the lithium-containing manganese oxide, such as $LiMnO_2$, is advantageous in that thermal stability is excellent and its price is low, but it has a problem that reversibly usable energy capacity is low and high-temperature characteristics are poor due to the occurrence of a phase transition phenomenon. Recently, a composite oxide having a layered structure and containing an excessive amount of lithium has received a lot of attention as a positive electrode active material to solve these problems and obtain high capacity.

However, it is necessary to simultaneously increase an amount of usable lithium as well as an amount of electrons reversibly usable in an electrochemical reaction in order to maximize electrochemical energy storage capacity of the metal oxide having a lithium-rich layered structure. That is, in order for the above theoretical cation/anion to react simultaneously in the layered-structure positive electrode material, structural stability must be increased so that a structurally large amount of lithium may be reversibly deintercalated/intercalated, and, at the same time, if the amount of the electrons usable in the electrochemical reaction is maximized by allowing oxygen as well as conventional transition metal to participate in supply and release of electrons, energy capacity, which may be reversible stored, may be significantly increased.

As described above, since there is a particular limitation in terms of energy density in order to use a conventionally known positive electrode active material of a lithium secondary battery in electric vehicles and medium and large-sized equipment, there is an increasing need to develop lithium-rich layered-structure materials (Li-rich layered compounds) that may reversibly use cations/anions at the same time. However, in order to reversibly use a large amount of lithium, the structural stability and the reaction of the anion must be maximized so that supply/demand of electrons particularly in the anion may be smoothly performed.

DISCLOSURE OF THE INVENTION

Technical Problem

The present invention provides a positive electrode active material for a lithium secondary battery, in which structural stability is ensured even if an excessive amount of lithium is fully deintercalated and, simultaneously, reversible electrochemical activity of cation/anion is maximized by controlling a distribution of the cations in the material to cause a change in local structure, and a method of preparing the same.

Technical Solution

According to a first embodiment of the present invention, there is provided a positive electrode active material for a lithium secondary battery which is a composite represented by the following [Formula 1], wherein the composite includes two phases having a layered structure, inter-diffusion of lithium and transition metals is performed between the two phases having the layered structure, and a lithium excess region and a cation-disordered region, where distinction between a lithium layer and a transition metal layer is not clear, are formed in both of the two layered structures.

$$aLi_{2-x}M1_zM2_yO_3 + bLi_{1+x}M2_{(1-y'),}O_2 \qquad \text{[Formula 1]}$$

(wherein, $0 < a < 1$, $0 < b < 1$, $a+b=1$, $0.1 \le x \le 0.3$, $0.1 \le x' \le 0.3$, $0.1 \le y \le 0.3$, $0.1 \le y' \le 0.3$, $0.1 \le z \le 0.3$, $ax=bx'$, $ay=by'$, and M1 and M2 are at least one selected from 3d, 4d, and 5d transition metals or non-transition metals which include aluminum (Al), magnesium (Mg), manganese (Mn), nickel (Ni), cobalt (Co), chromium (Cr), vanadium (V), and iron (Fe), and satisfy electrical neutrality according to an amount of lithium and type and oxidation number of M1 and M2 which are inter-diffused between the two layered structures)

In the first embodiment, the two phases having the layered structure in the composite include atoms in a layer in which the lithium is present in a larger amount than the transition metal between the lithium layer and the transition metal layer, and a ratio of the lithium/the transition metal in each layered structure may be 1 or more.

In the first embodiment, in the two phases having the layered structure, a portion of neutron peaks of the two phases, which appear in measurements by neutron diffraction, appears in a merged form, wherein a ratio of the peaks may satisfy $0.9 < I(\sim66°)/I(\sim68°) < 1.1$ and $1.2 < I(\sim82°)/I(\sim83°) < 1.8$.

In the first embodiment, the composite is represented by the following [Formula 2], and, when a cation distribution between the two phases having the layered structure is measured by energy dispersive X-ray spectroscopy (EDS) or electron energy loss spectroscopy (EELS) of a transmission electron microscope (TEM), a value of $2ay/3b(1-y')$ or a value of $3b(1-y')/2ay$, a deviation of distribution of a ratio between M1 and M2 which are different transition metals from each other, may be in a range of −20% to 20%.

$$Li_{2a(2-x)/3+b(1+x')}M1_{2az/3}M2_{2ay/3+b(1-y')}O_2 \qquad \text{[Formula 2]}$$

(wherein, $0 < a < 1$, $0 < b < 1$, $a+b=1$, $0.1 \le x \le 0.3$, $0.1 \le x' \le 0.3$, $0.1 \le y \le 0.3$, $0.1 \le y' \le 0.3$, $0.1 \le z \le 0.3$, $ax=bx'$, $ay=by'$, and M1 and M2 are at least one selected from 3d, 4d, and 5d transition metals or non-transition metals which include Al, Mg, Mn, Ni, Co, Cr, V, and Fe, and satisfy electrical neutrality according to an amount of lithium and type and oxidation number of M1 and M2 which are inter-diffused between the two layered structures)

In the first embodiment, in each of the two phases having the layered structure, an amount of the lithium, which is obtained by lithium (Li)-nuclear magnetic resonance spectroscopy (NMR) analysis, may satisfy $0 < |a(2-x)/\{a(2-x)+b(1+x')\}-b(1+x')/\{a(2-x)+b(1+x)\}| < 0.35$.

In the first embodiment, when the positive electrode active material represented by [Formula 1] has a predetermined local structure, in both of the two phases having the layered structure, cations have an irregular distribution between the lithium layer and the transition metal layer, and an amount of irregular transition metals present in the lithium layer during neutron and X-ray diffraction (XRD) refinements may be in a range of 4% to 20%.

In the first embodiment, when the positive electrode active material represented by [Formula 1] has a predetermined local structure, in both of the two phases having the layered structure, cations have an irregular distribution between the lithium layer and the transition metal layer, and atoms in the irregular layer may exist on a scale of 2 nm to 100 nm when the atoms are analyzed by high-angle annular dark-field (HAADF) or annular bright-field (ABF) imaging of a scanning transmission electron microscope (STEM).

According to a second embodiment of the present invention, there is provided a method of preparing the positive electrode active material according to the first embodiment which includes: mixing two or more metal precursors which include lithium and at least one of transition metals, performing primary sintering of the mixed material, grinding the sintered material to reduce a particle size, performing secondary sintering at 700° C. to 1,000° C., and quenching the secondary sintered material.

According to a third embodiment of the present invention, there is provided a method of preparing the positive electrode active material according to the first embodiment which includes: mixing and grinding two or more metal precursors which include lithium and at least one of transition metals, sintering the mixed and ground precursors in a high temperature range of 700° C. to 1,000° C., and quenching the sintered material.

According to a fourth embodiment of the present invention, there is provided a method of preparing the positive electrode active material according to the first embodiment which includes: preparing each of precursors which respectively synthesize $Li_2M1O_3$ and $LiM2O_2$, performing primary sintering of the each precursor at 700° C. to 1,000° C., grinding each of the sintered materials and mixing the ground materials according to a ratio of two phases, performing secondary sintering of the mixed material at 700° C. to 1,000° C., and quenching the re-sintered material.

In the second to fourth embodiments of the present invention, the grinding may be performed by at least one method selected from high-energy ball milling, high-pressure water milling, air-jet milling, and roller milling.

In the second to fourth embodiments of the present invention, the sintering may be performed above 900° C.

In the second to fourth embodiments of the present invention, the primary sintering may be performed at 800° C. to 1,000° C.

In the second to fourth embodiments of the present invention, the quenching may be performed at 800° C. to 1,000° C.

In the second to fourth embodiments of the present invention, the quenching may be performed at a cooling rate of 500° C./min to 900° C./min.

Advantageous Effects

A local structure of a typical lithium-rich (Li-rich) layered-structure composite oxide is a solid-solution (mainly in terms of transition metal) or composite structure of a Li-rich layered structure ($Li_2MO_3$) and a typical lithium layered structure ($LiMeO_2$).

In contrast, a local structure formed by the invention is a structure in which lithium and transition metals form a disordered structure, where elements are mixed between a lithium layer and a transition metal layer in a section of an entire layered-structure material, and, simultaneously, an excessive amount of lithium is included in a typical lithium layered ($LiMeO_2$) structure as well as a Li-rich layered structure ($Li_2MO_3$).

A material having the above structure forms a Li-rich layered-structure composite oxide material in which a distribution of cations is controlled, the material thus formed may maximize a cation/anion reaction due to a change in the local structure, and, accordingly, energy capacity may be significantly improved and cycle stability may be increased at the same time. Particularly, a voltage drop phenomenon is significantly reduced and a decrease in the capacity is greatly improved.

Since a method according to the invention may provide a core process for forming a positive electrode material of a high-capacity secondary battery or may provide a Li-rich layered-structure composite oxide with a local structure having a distribution of specific cations (lithium and transition metals) with high electrochemical activity, the method may be applied to various positive electrode active materials and, accordingly, their energy capacity may be significantly improved.

BRIEF DESCRIPTION OF THE DRAWINGS

FIGS. 4 to 7 compare analysis results of powder obtained according to Example 1 or 2 (in the drawings, indicated by [FIG. 1] or [FIG. 2]) of the invention using neutron, TEM, and NMR with those of a typically synthesized lithium-rich layered-structure composite oxide;

MODE FOR CARRYING OUT THE INVENTION

Figure 1:
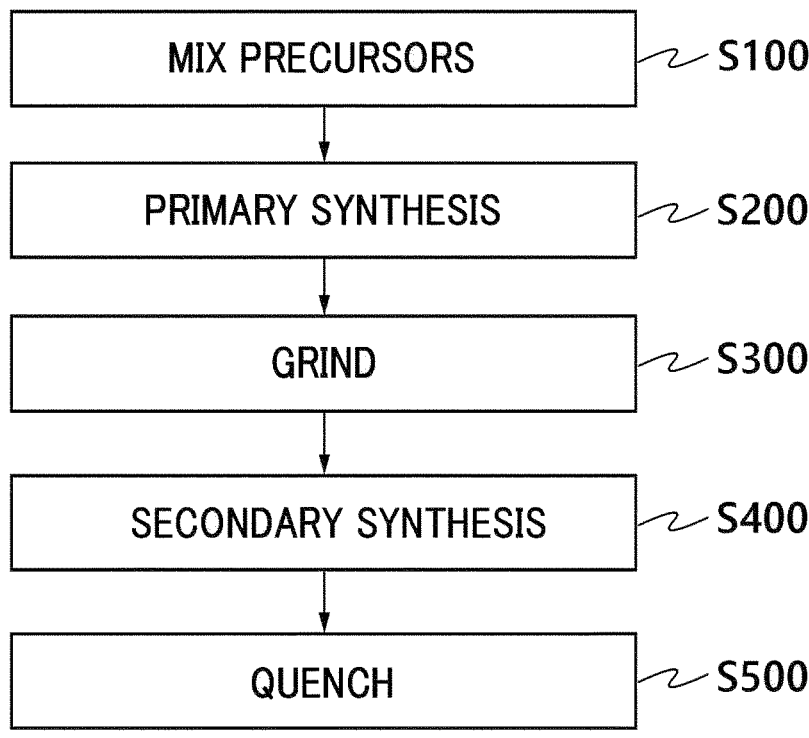
FIG. 1 is a flowchart illustrating a method of synthesizing a lithium-rich layered-structure composite oxide according to Example 1 of the invention.

Hereinafter, the invention will be described in more detail on the basis of preferred embodiments of the invention. However, the following embodiments are merely examples for helping understanding of the invention, and the scope of the invention is not reduced or limited by the embodiments.

The invention relates to a method of synthesizing a lithium-rich (Li-rich) layered-structure composite oxide positive electrode active material by controlling a distribution of cations in which a cationic oxidation/reduction reaction caused by a change in oxidation number of transition metal and a reversible oxidation/reduction reaction of an oxygen ion may be operated at the same time, a process of controlling the distribution of the cations to significantly increase electrochemical activity of the composite thus synthesized, and its product.

Different from the fact that the Li-rich layered-structure composite oxide is theoretically known, but it has been difficult to ensure high activity in a conventional approach, since improved capacity may be ensured through the reversible oxygen ion reaction, energy capacity of the positive electrode material may be significantly improved by the process of the invention.

The invention proposes a method of synthesizing a mixture, which has a solid-solution or composite structure of a Li-rich layered structure ($Li_2MO_3$) and a typical lithium layered structure ($LiMeO_2$) in a Li-rich layered-structure composite oxide already known, but has a different composition, a different distribution of cations, or a different internal structure, by controlling a composition of lithium and transition metals, and proposes a new heat treatment method to increase electrochemical activity. It may be confirmed that inter-diffusion between components of cationic metals, such as lithium, nickel, and manganese, is performed by the new heat treatment process. As described above, a change in distribution of each component in a crystal structure may occur and, simultaneously, the electrochemical activity may also be increased.

In the material synthesized by the method according to the invention, a local structure appeared by the distribution of the cations is different from a local structure of a typical Li-rich layered-structure composite oxide.

The local structure typically formed is a solid-solution or composite structure of a Li-rich layered structure ($Li_2MO_3$) and a typical lithium layered structure ($LiMeO_2$), wherein the local structure formed in the invention is a structure in which cations of lithium and transition metals form a disordered structure, where elements are mixed between a lithium layer and a transition metal layer in a section of the entire layered-structure material, and, simultaneously, an excessive amount of lithium is included in a typical lithium layered ($LiMeO_2$) structure as well as a Li-rich layered-structure ($Li_2MO_3$). Thus, the Li-rich layered ($Li_2MO_3$)-layered ($LiMeO_2$) structure composite oxide with a local structure having an optimum cation distribution suggested in the invention may synthesize a positive electrode active material for a secondary battery with high capacity performance through a reversible oxygen ion reaction in comparison to a typical layered structure mixture which has not been subjected to the heat treatment process according to the invention.

Also, in order to synthesize the above-described Li-rich layered ($Li_2MO_3$)-layered ($LiMeO_2$) structure composite oxide, a solid-phase method was used in the invention, but electrochemical performance may be improved when composites synthesized by a co-precipitation method, an ion exchange reaction under hydrothermal condition, and ultrasonic spray pyrolysis are also subjected to the process developed in the invention. That is, in the invention, overall performance of most Li-rich layered-structure mixtures may be improved regardless of the synthesis method by applying the developed process as a post-treatment process, regardless of the method of preparing the composite.

Thus, the invention proposes a method of preparing a Li-rich layered ($Li_2MO_3$)-layered ($LiMeO_2$) structure composite oxide in which capacity and power characteristics are improved in comparison to those of the same material formed by a conventional method through the additional process according to the invention and a local structure having a new distribution of cations.

Specifically, in the invention, proposed is a method of obtaining a positive electrode material for a lithium secondary battery, which is characterized by a form or a composition including a composite which has a layered structure with a Li-rich layered-structure ($Li_2MO_3$)-based monoclinic structure and has a typical layered structure ($LiMeO_2$)-based hexagonal structure not including an excessive amount of lithium, by synthesizing by a solid-phase method by adjusting a composition of lithium and transition metals in the Li-rich layered ($Li_2MO_3$)—typical lithium layered ($LiMeO_2$) composite oxide with a known layered structure according to a stoichiometric ratio, or which is characterized by a composite in which the two phases are separately synthesized and then mechanically mixed according to the composition, and improving electrochemical activity and power characteristics of the material when the process according to the invention is further applied to the synthesized composite.

In general, a Li-rich layered-structure composite oxide material is a material represented by the following [Formula 3].

$$aLi_2MO_3 + (1-a)LiMeO_2 \qquad \text{[Formula 3]}$$

(wherein, $0 < a < 1$, M and Me are at least one selected from 3d, 4d, and 5d transition metals or non-transition metals which include aluminum (Al), magnesium (Mg), manganese (Mn), nickel (Ni), cobalt (Co), chromium (Cr), vanadium (V), and iron (Fe), and M and Me may be the same or different from each other)

In this case, it is known that an irreversible oxygen gas release reaction and a reversible oxygen ion oxidation/reduction (redox) reaction occur in Li-rich layered-structure $Li_2MO_3$ in the Li-rich layered-structure ($aLi_2MO_3 + (1-a)$ $LiMeO_2$) composite oxide at a high voltage of 4.5 V or more in an initial charge process.

Theoretical capacity, which is determined by electrons that may be provided by a change in oxidation number of transition metal in most Li-rich layered-structure materials, is approximately limited by an amount of the transition metal (~125 mAh/g with respect to $Li_{1.2}Ni_{0.2}Mn_{0.6}O_2$), and theoretical capacity determined by an amount of lithium is not limited and is determined by an amount of lithium available if the supply/release of electrons become reversible by oxygen. With respect to $Li_{1.2}Ni_{0.2}Mn_{0.6}O_2$, the oxygen ion oxidation/reduction reaction, instead of the oxygen gas release reaction, must be activated if a total amount of the lithium is used as reversible capacity (~390 mAh/g).

With respect to a Li-rich layered-structure composite oxide material synthesized by a typical solid-phase method (e.g., with respect to $Li_{1.2}Ni_{0.2}Mn_{0.6}O_2$), a redox reaction occurs not only by transition metals but also by oxygen ions, wherein a reversible capacity of 250 mAh/g, which is much less than a theoretical capacity of ~390 mAh/g, is obtained, and this is due to the fact that activity of the reversible oxygen ion reaction is not high.

Two conditions are required in order to reversibly contribute the total amount of the lithium to the capacity, wherein, first, structural stability must be maintained so that the layered structure is not collapsed in a deintercalation process of the lithium, and, second, in a reaction in which the lithium is deintercalated, a reaction, in which electrons are reversibly released/supplied to oxygen ions, must occur stably.

In order to satisfy these two conditions, a uniform distribution of elements must be made, wherein it is an important factor to secure the stability of the layered structure and optimize the chemical composition through a change in specific local structure in which the transition metals and the lithium are inter-diffused between a $LiMeO_2$ layered-structure material and a $Li_2MO_3$ Li-rich layered-structure material so that both of the layered materials become Li-rich and cation disordering increases. That is, in the invention, the maximization of the stability of the layered structure to deintercalate/intercalate the total amount of the lithium and the use of the cation disordering to increase the reversibility of the oxygen redox reaction are different from previously developed methods.

In general, cation disordering in a layered structure means that transition metal and lithium are not present only in each layer between the lithium layer and the transition metal layer, but are randomly present without distinguishing the layers. In most cases, it is known that the cation disordering is mainly present only in a $LiMeO_2$ layered-structure portion and is not present in a Li-rich layered-structure ($Li_2MO_3$) portion.

Figure 5:
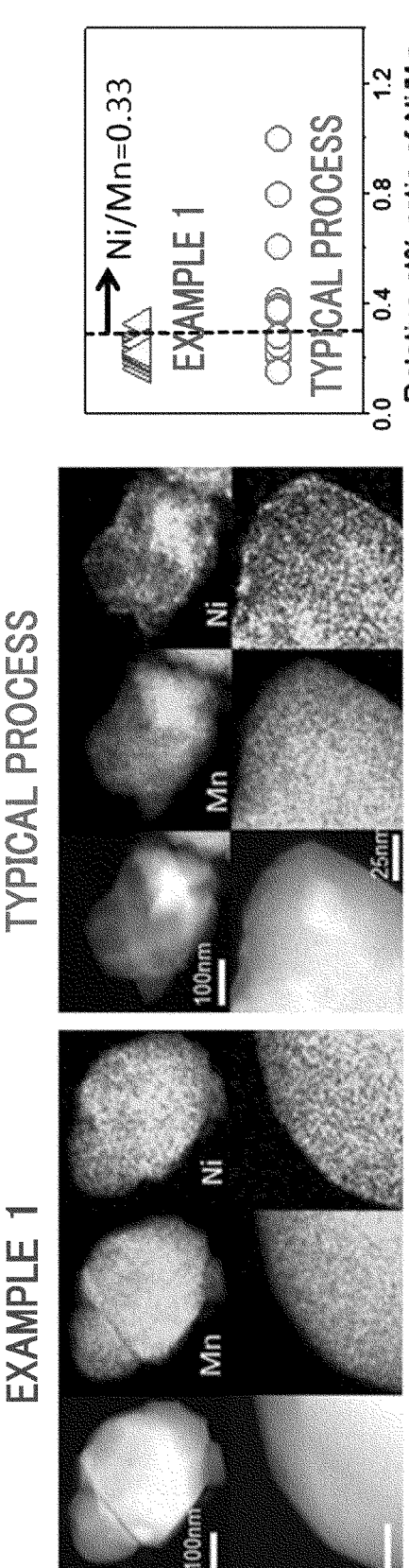

However, in a case in which the preparation method according to the invention is applied to the known $Li_{1.2}Ni_{0.2}Mn_{0.6}O_2$, that is, in a case in which the invention is applied to the $Li_{1.2}Ni_{0.2}Mn_{0.6}O_2$ which is composed of 50% LNMO and 50% $Li_2MnO_3$, it may be confirmed through FIG. 5 (energy dispersive X-ray spectroscopy (EDS) mapping) that a uniform distribution of Ni/Mn elements is obtained while charge neutrality is achieved by the occurrence of inter-diffusion between one $Ni^{2+}$ of the LNMO and two $Li^+$ of the $Li_2MnO_3$ at high temperature.

In contrast, it is confirmed that one synthesized by a conventional method has a non-uniform distribution of Ni/Mn elements. The non-uniform distribution of the Ni/Mn elements may mean that a Li-rich $Li_2MnO_3$ phase and a LNMO phase, which is a general layered structure, exist separately. (around 100 nm in data at a transmission electron microscope (TEM) level)

As a result, structural stability and high reversible oxygen ion reactivity, as the above two conditions, may be obtained by the uniform inter-diffusion of Li-TM (transition metal).

Figure 6:
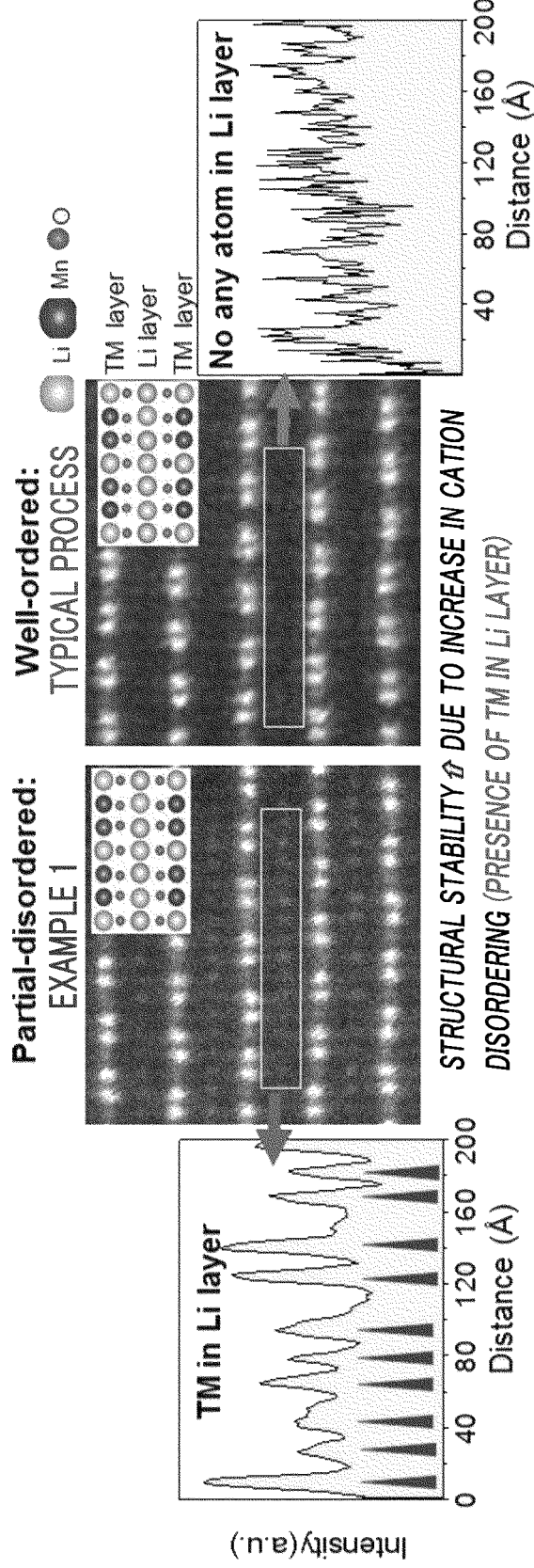

First, with respect to the structural stability, cation disordering, in which the transition metal is present in the lithium layer, is present in both the lithium layered structure of $LiMeO_2$ and the Li-rich layered structure of $Li_2MO_3$ as illustrated in FIG. 6 (high-angle annular dark-field (HAADF)-scanning transmission electron microscope (STEM)). Since the cation disordering is present in the two phases at the same time, the structural stability of the Li-rich layered-structure composite oxide may be significantly improved.

Also, since the cations are randomly distributed, various connections between oxygen and the cations, particularly lithium ions, may be made. Since a change in surrounding environment of oxygen ions and a change in the local structure affect a position and a width (broadness) of an orbital of the oxygen ions in an electronic structure of the synthesized material, the activity of the reversible oxygen ion reaction may be increased.

With respect to the high reversible oxygen ion reactivity, as may be confirmed by nuclear magnetic resonance spectroscopy (NMR) (FIG. 7) which may identify a local amount and a surrounding environment of lithium, the presence of excess lithium in both layered structures, unlike a material synthesized by a conventional method, may also maximize the reversible activity of the oxygen ions.

In a conventional structure, since excess lithium is present only in $Li_2MO_3$, the oxygen redox reaction mainly occurs in the $Li_2MO_3$, but, in a case in which the method according to the invention is used, since excess lithium is present not only in $Li_2MO_3$ but also in $LiMeO_2$, as a typical lithium layered structure, at the same time, the activity of the oxygen redox reaction is significantly increased in both of the two layered structures.

In a case in which the method according to the invention, in which a quenching process is used after a material synthesized by mixing precursors or by primary sintering is subjected to grinding and mixing processes, is applied to a Li-rich layered structure of a known composition or a Li-rich layered structure of a new composition, a change in solubility limit between elements of the transition metals, such as lithium, nickel and manganese, in each of the layered structures ($Li_2MO_3$ and $LiMeO_2$) of the Li-rich layered structure at high temperatures (700° C. or more, preferably 800° C. or more) may be used to induce inter-diffusion, and the change may be stabilized by a difference in entropy at high temperatures.

In addition, when, after the mixture of the precursors or the primary-sintered material is subjected to the grinding and mixing processes, the quenching process according to the invention is used, inter-diffusion interaction between the elements, such as lithium and transition metals, may also be increased in this case to obtain an optimized structure which may increase the structural stability and the electrochemical activity of oxygen, as the two conditions able to achieve high reversible capacity as described above, wherein, as a result, all lithium ions may be deintercalated as in FIG. 6, and high reversible capacity may be achieved at the same time.

In a case in which a Li-rich layered-structure composite $aLi_2MO_3(1-a)Li_xMeO_2$ of a known composition or new composition is synthesized by adjusting a composition of lithium and transition metals, such as manganese and nickel, according to a stoichiometric ratio and using the process proposed in the invention, or is synthesized by separately synthesizing and mixing a Li-rich layered structure ($Li_2MO_3$) phase and a typical lithium layered structure ($LiMeO_2$) phase and using a new process method according to the invention, a high-capacity Li-rich layered-structure composite oxide, in which cations/anions may be subjected to a reversible redox reaction at the same time and a large amount of lithium may be deintercalated/intercalated by the stability of the layered structure, may be simply mass-produced.

In this case, in order to form a layered structure with conditions for optimizing the reversible oxygen ion reaction through the above process, amounts of the Li-rich layered structure ($Li_2MO_3$) phase and the typical lithium layered structure ($LiMeO_2$) phase may be adjusted by adjusting the amounts of the lithium and the transition metals in the composition represented by [Formula 1].

If a composition includes the Li-rich layered structure ($Li_2MO_3$) phase and the typical lithium layered structure ($LiMeO_2$) phase, an effect of significantly increasing reversible redox reaction activities of the transition metals and oxygen may be obtained without limitation by the method according to the invention.

Thus, a similar effect is also obtained in a composition including the Li-rich layered structure ($Li_2MO_3$) and the typical lithium layered structure ($LiMeO_2$) as in the following [Formula 4], or by separately synthesizing the two phases, being subjected to mechanical mixing, and then being subjected to the process according to the invention.

$$(1-a)Li_2MO_3 + aLiMeO_2 \qquad \text{[Formula 4]}$$

(wherein, $0<a<1$, M and Me are at least one selected from 3d, 4d, and 5d transition metals or non-transition metals which include Al, Mg, Mn, Ni, Co, Cr, V, and Fe, and M and Me may be the same or different from each other)

FIG. 1 is a flowchart illustrating a method of synthesizing a lithium-rich layered-structure composite oxide according to Example 1 of the invention.

Referring to FIG. 1, the method of synthesizing a lithium-rich layered-structure composite oxide according to Example 1 of the invention includes the steps of: mixing a lithium precursor and transition metal precursors (S100), putting the mixture in a heating furnace and performing primary sintering in an air atmosphere (S200), natural cooling a material formed by the primary sintering and grinding the material with a high-energy ball mill (S300), putting the ground material in a heating furnace and performing secondary sintering in an air atmosphere (S400), and performing a quenching process on the secondary sintered composite (S500), wherein positive electrode materials for a lithium secondary, which are represented by [Formula 1] and [Formula 2], may be prepared by the method.

Also, before step S100, each of the metal precursors may be prepared by a pretreatment process including a mixing process of raw materials, a drying process, and a pelletizing process.

Specifically, in the mixing process of the raw materials, each of the metal precursors is added to an acetone solvent and may then be mixed using a ball mill. Herein, ball milling may be performed for about 6 hours to about 24 hours.

If, in a case in which the ball milling is performed for less than 6 hours, dissolution, grinding, or mixing of the added precursors is not sufficient, and, in a case in which the ball milling is performed for greater than 24 hours, it may be economically disadvantageous because the processing time is extended while a mixing effect is saturated.

A solvent, such as acetone or water, is used as the solvent used during the mixing in the invention, but any material may be used without limitation as long as it is a material which may appropriately mix the precursors and does not affect a subsequent process. Also, if a uniform mixture of the prepared precursors may be prepared without performing ball milling, the precursor may be prepared by a simple stirring process.

In the drying process of the pretreatment process, the precursors mixed by the mixing process may be heated to a predetermined temperature to remove the solvent. In the drying process, the mixture including the solvent is heated to about 100° C. or less using equipment such as a hot plate. In this case, if the mixture is heated to greater than 100° C., the precursors may react to form a different phase.

Furthermore, the pelletizing process of the pretreatment process is to facilitate the synthesis by allowing a gas component decomposed in the subsequent process to be easily released, wherein pellets having an average diameter of 1 cm may be made by using a pelletizing device. However, the diameter of the pellet is not particularly limited in the pelletizing process.

Herein, the lithium precursor may include $Li_2CO_3$ and $LiNO_3$. Each metal precursor may provide a metallic component to the composition of [Formula 1]. Also, a manganese precursor and a nickel precursor may include a material which may synthesize a material by heating.

In step S200, a phase may be formed by obtaining only metal components from the mixture by removing carbonate or nitrate attached to metal oxide, metal nitride, and metal oxynitride, as the metal precursors, through a primary sintering process at about 800° C. to about 900° C. as a heating condition of a solid-phase reaction.

In step S300, mechanical grinding may be performed with a high-energy ball mill. The mechanical grinding in step S300 is to further activate the inter-diffusion of elements between the typical lithium layered structure ($LiMeO_2$) and the Li-rich layered structure ($Li_2MO_3$), as components of the two layered structures. That is, the mechanical grinding process may further increase the activation reaction.

Herein, the grinding of the mixture may be performed for about 2 hours to about 3 hours, but may be performed by other chemical or physical processes, which may reduce a particle size of powder, for example, high-pressure water milling, air-jet milling, and roller milling.

In step S400, in order to obtain an effect of promoting interaction between components of a composite through a heat treatment process, secondary sintering (annealing) may be performed at about 700° C. to about 1,000° C. In this case, in a case in which sintering time is excessively increased, since a particle size is increased, an initial activation process may not be performed well. Thus, it is appropriate to perform the secondary sintering for about 1 hour to about 10 hours.

In step S500, quenching may be performed after the secondary sintering.

Herein, after interaction between solubility of the components of each layered structure and anion electrochemical activity of the layered structure is performed at about 700° C. to about 1000° C., high-temperature quenching is a process of increasing a cooling rate so as to maintain the above state. Since solubility of each phase is again changed if slow cooling is performed, a typical Li-rich layered structure composite oxide with low anion reaction activity is prepared while the anion electrochemical activity of the layered-structure material is also changed.

Since the high-temperature quenching process is a process of maintaining the structure or composition of the mixture at high temperature as it is, the high-temperature quenching process is not limited by a difference in the synthesis method that is the previous step.

Figure 2:
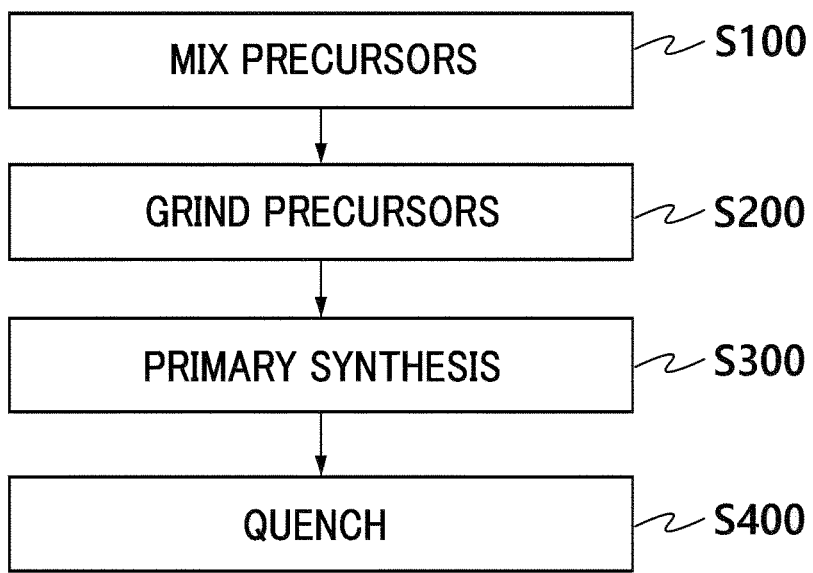
FIG. 2 is a flowchart illustrating a method of synthesizing a lithium-rich layered-structure composite oxide according to Example 2 of the invention.

FIG. 2 is a flowchart illustrating a method of synthesizing a lithium-rich layered-structure composite oxide according to Example 2 of the invention.

Referring to FIG. 2, the method of synthesizing a lithium-rich layered-structure composite oxide according to Example 2 of the invention may prepare positive electrode materials for a lithium secondary, which are represented by [Formula 1] and [Formula 2], by including the steps of: mixing a lithium precursor and transition metal precursors (S100), grinding the mixed precursors with a high-energy ball mill (S200), putting the ground material in a heating furnace and performing primary sintering in an air atmosphere (S300), and rapid cooling the primary sintered composite by a quenching process (S400).

The overall process is similar to that of FIG. 1, but a difference from FIG. 1 is that the mixed precursors are directly subjected to a grinding process and a quenching process is then used in the primary sintering process.

In a case in which the process of FIG. 1 is applied, after the two components of the layered structures are synthesized by the primary sintering, the interaction, such as the inter-diffusion of the elements, occurs when the temperature reaches a high temperature in the secondary sintering process. In contrast, in a case in which the process of FIG. 2 is applied, there is a difference in that arrangement and inter-action of the elements occur before the phases of the two layered structures are formed during the primary sintering, but, as a result, since the structure and composition are greatly affected by the temperature, the effect of process differences is not significant. The process of FIG. 2 is advantageous in that it may synthesize the positive electrode material according to the invention in a simpler process than that of FIG. 1.

Figure 3:
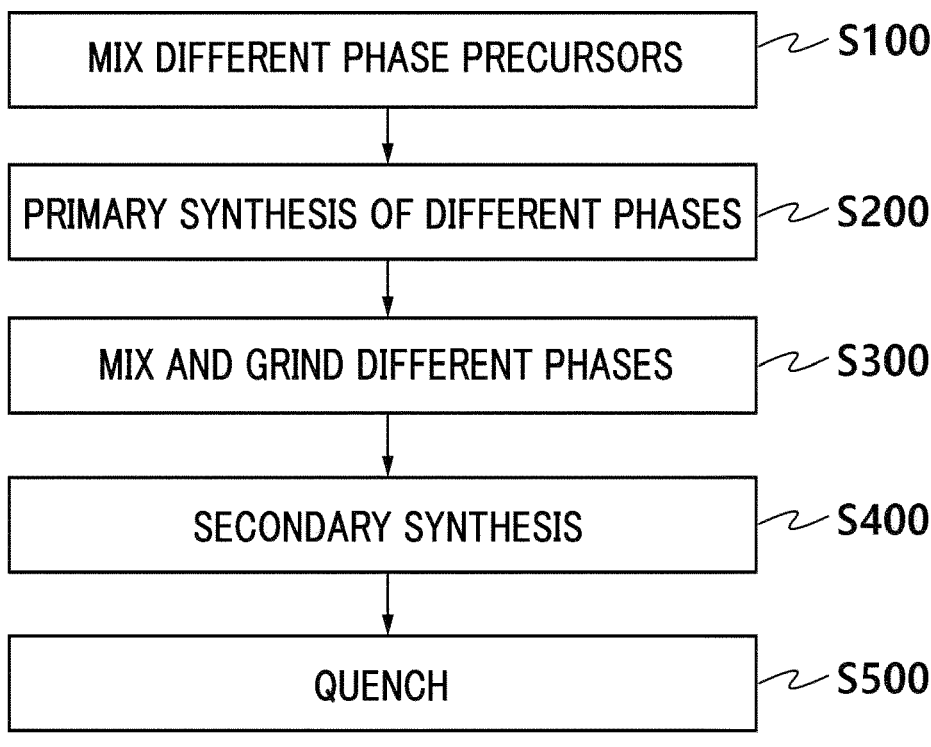
FIG. 3 is a flowchart illustrating a method of synthesizing a lithium-rich layered-structure composite oxide according to Example 3 of the invention.

Also, FIG. 3 is a flowchart illustrating a method of synthesizing a lithium-rich layered-structure composite oxide according to Example 3 of the invention. In order to separately obtain Li-rich layered-structure $Li_2MO_3$ and typi-cal lithium layered-structure $LiMeO_2$, the method of syn-thesizing a lithium-rich layered-structure composite oxide according to Example 3 of the invention may prepare positive electrode materials for a lithium secondary, which are represented by [Formula 1] and [Formula 2], by includ-ing the steps of: mixing a lithium precursor and transition metal precursors (S100), putting the mixture in a heating furnace and performing primary sintering in an air atmo-sphere (S200), mixing Li-rich layered-structure $Li_2MO_3$ and typical lithium layered-structure $LiMeO_2$, which are obtained after natural cooling the material obtained by the primary sintering, and grinding the mixture with a high-energy ball mill (S300), putting the ground material in a heating furnace and performing secondary sintering in an air atmosphere (S400), and performing a quenching process on the secondary sintered material (S500).

Hereinafter, an overlapping description of the same method as in Examples 1 and 2 will be omitted.

According to embodiments of the invention, the invention prepare a Li-rich layered-structure composite oxide, in which the reaction of cations/anions, particularly oxygen ions, as anions, is activated, by performing a heat treatment at about 700° C. to about 1,000° C. after high-energy ball milling, as an additional process, and then high-temperature quenching.

The positive electrode active materials prepared by the embodiments are represented by the following [Formula 1], and a local structure having a specific cation distribution may have a form in which excess Li and cation disordering between a layered-structure lithium layer and a transition metal layer are present at the same time in $Li_2MO_3$ and $Li_xMeO_2$, as the two layered structures.

$$aLi_{2-x}M1_zM2_yO_3 + bLi_{1+x}M2_{(1-y')}O_2 \qquad \text{[Formula 1]}$$

(wherein, $0<a<1$, $0<b<1$, $a+b=1$, $0.1 \leq x \leq 0.3$, $0.1 \leq x' \leq 0.3$, $0.1 \leq y \leq 0.3$, $0.1 \leq y' \leq 0.3$, $0.1 \leq z \leq 0.3$, $ax=bx'$, $ay=by'$, and M1 and M2 are at least one selected from 3d, 4d, and 5d transition metals or non-transition metals which include Al, Mg, Mn, Ni, Co, Cr, V, and Fe, and satisfy electrical neutrality according to an amount of lithium and type and oxidation number of M1 and M2 which are inter-diffused between the two layered structures)

In a case in which the positive electrode active material represented by [Formula 1] has a specific local structure, it may have characteristics in which cations between the two layered-structure materials have a uniform distribution, and, since solid solutionization occurs by cation diffusion between the two layered-structure materials, X-ray diffrac-tion (XRD) peaks between the $Li_2MO_3$ and $LiMeO_2$ phases appear in a merged form in comparison to a conventional material of the same composition.

Also, in the case that the positive electrode active material represented by [Formula 1] has a specific local structure, it may have characteristics in which the cations between the two layered-structure materials have a uniform distribution, this is due to the inter-diffusion between lithium in the Li-rich layered-structure material and transition metals of the typical layered-structure material, and the distribution of the elements may be confirmed by techniques such as EDS and electron energy loss spectroscopy (EELS) of a TEM.

Furthermore, in the case that the positive electrode active material represented by [Formula 1] has a specific local structure, it may have characteristics in which the local structure including excess lithium simultaneously between the two layered-structure materials in the form of $Li_{2-x}MMe_yO_3$ and $Li_{1+x}Me_{(1-y)}O_2$ is due to the inter-diffusion between lithium in the Li-rich layered-structure material and transition metals of the typical layered-structure material, x, an amount of the lithium transferred, and y, an amount of the transition metal, are determined in such a manner that the oxidation number of the transition metal and electrical neutrality of each layered material are maintained, and the excess lithium in the two layered-structure materials may be confirmed by techniques such as Li-NMR and neutron diffraction.

Also, in the case that the positive electrode active material represented by [Formula 1] has a specific local structure, it may have characteristics in which the local structure includ-ing excess lithium simultaneously between the two layered-structure materials in the form of $Li_{2-x}MMe_yO_3$ and $Li_{1+x}Me_{(1-y)}O_2$ is due to the inter-diffusion between lithium in the Li-rich layered-structure material and transition metals of the typical layered-structure material, x, an amount of the lithium transferred, and y, an amount of the transition metal, are determined in such a manner that the oxidation number of the transition metal and electrical neutrality of each layered material are maintained, and the excess lithium in the two layered-structure materials may be confirmed by techniques such as Li-NMR and neutron diffraction.

The positive electrode materials prepared by the above embodiments may be used in a positive electrode for a lithium secondary battery and a lithium secondary battery including the positive electrode.

Hereinafter, specific examples of the invention are presented. However, the examples described below are only intended to illustrate or explain the invention, and thus the invention should not be limited thereto.

Example 1

In Example 1 of the invention, as $Li_{1.2}Ni_{0.2}Mn_{0.6}O_2$, a known composition of Li-rich layered composite oxide, $0.5Li_2MnO_{3.0}·5LiNi_{0.5}Mn_{0.5}O_2$ was synthesized by the method illustrated in FIG. 1 by selecting a as 0.5, M1 as Mn, and M2 as Ni and Mn in [Formula 1].

First, as precursors for a solid-phase reaction, $Li_2CO_3$ (Junsei, purity 99% or more), $NiCO_3$ (Alfa Aesar, purity 99% or more), and $MnO_2$ (Alfa Aesar, purity 99% or more) were prepared as follows.

$$0.6Li_2CO_3+0.2NiCO_3+0.6MnO_2$$

Specifically, a weight of each material prepared was 1 g of $Li_2CO_3$, 0.536 g of $NiCO_3$, and 1.17 g of $MnO_2$, and the precursors were mixed at a ratio of 50 wt % of $LiNi_{0.5}Mn_{0.5}O_2$ to 50 wt % of $Li_2MnO_3$.

After the precursors thus prepared were added to an acetone solvent, a uniformly mixed mixture was prepared while aggregated powder of the precursors was disintegrated by ball milling for about 12 hours. Zirconia balls having diameters of 3.5 mm and 10 mm were used for the ball milling.

After the powder was mixed by the ball milling, the mixture was dried at a temperature of 100° C. or less in air using a hot plate, and the dried mixture was formed into pellets using a disc-shaped mold.

After the pellets thus prepared were put in an alumina crucible and subjected to a calcination process at 900° C. in an air atmosphere, the pellets were ground by high-energy ball milling for about 2 hours 20 minutes, wherein, in this case, zirconia balls having a diameter of 1 mm were used for the ball milling.

After the powder was ground by the ball milling, the mixture was dried at a temperature of 100° C. or less in air using a hot plate, and the dried mixture was formed into pellets using a disc-shaped mold.

Thereafter, sintering (re-annealing) was performed at 900° C. for about 5 hours. In this case, a heating rate was 4° C./min and the sintered pellets were taken out from a furnace immediately after heating and subjected to a quenching process in air.

Powder obtained by the method as described above was analyzed using XRD, TEM, and NMR, and the results thereof are presented in FIGS. 4, 5, 6, and 7.

Figure 4:
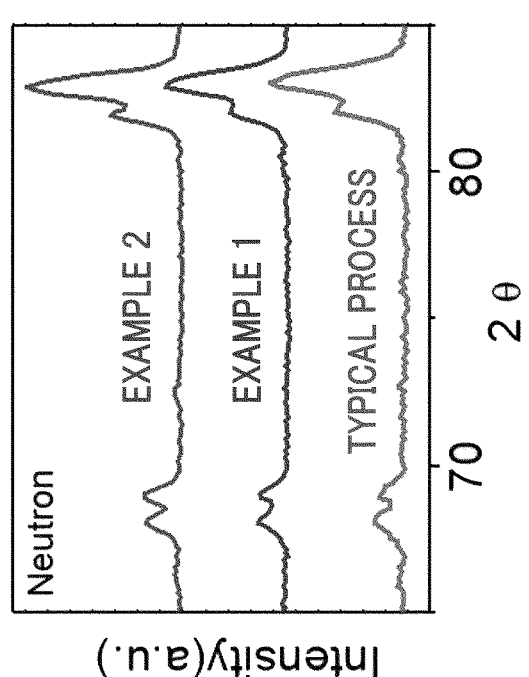

As confirmed in FIG. 4, the powder obtained according to Example 1 of the invention was similar to a neutron pattern of a typically synthesized Li-rich layered-structure composite oxide, and, in this case, it may be confirmed that a ratio of peaks of two phases was different from that of a typical process, and there may be some errors.

Example 2

In Example 2 of the invention, as $Li_{2.2}Ni_{2.2}Mn_{2.6}O_2$, a known composition of Li-rich layered composite oxide as the same composition as in Example 1, $0.5Li_2MnO_{3.0}·5LiNi_{2.5}Mn_{2.5}O_2$ was synthesized by the method illustrated in FIG. 2 by selecting a as 0.5, M1 as Mn, and M2 as Ni and Mn in [Formula 1].

First, as precursors for a solid-phase reaction, $Li_2CO_3$ (Junsei, purity 99% or more), $NiCO_3$ (Alfa Aesar, purity 99% or more), and $MnO_2$ (Alfa Aesar, purity 99% or more) were prepared as follows.

$$0.6Li_2CO_3+0.2NiCO_3+0.6MnO_2$$

Specifically, a weight of each material prepared was 1 g of $Li_2CO_3$, 0.536 g of $NiCO_3$, and 1.17 g of $MnO_2$, and the precursors were mixed at a ratio of 50 wt % of $LiNi_{0.5}Mn_{0.5}O_2$ to 50 wt % of $Li_2MnO_3$.

After the precursors thus prepared were added to an acetone solvent, a uniformly mixed mixture was prepared while aggregated powder of the precursors was disintegrated by ball milling for about 12 hours. Zirconia balls having diameters of 3.5 mm and 10 mm were used for the ball milling.

After the powder was mixed by the ball milling, the powder was ground by high-energy ball milling, wherein, in this case, zirconia balls having a diameter of 1 mm were used for the ball milling.

After the powder was ground by the ball milling, the mixture was dried at a temperature of 100° C. or less in air using a hot plate, and the dried mixture was formed into pellets using a disc-shaped mold.

Thereafter, calcination was performed at 900° C. for about 10 hours. In this case, a heating rate was 4° C./min and the pellets were taken out from a furnace immediately after heating and subjected to a quenching process in air.

Example 3

In Example 3 of the invention, a positive electrode active material according to the invention was synthesized by using the following [Formula 5] as a starting material.

$$(1-a)Li_2MO_3+aLi_xMe_{1-x}O_2 \qquad \text{[Formula 5]}$$

(wherein, $0<a<1$, $0.1≤x$, $x'≤1.2$, and M is any one element selected from 3d, 4d, and 5d transition metals or non-transition metals which include Al, Mg, Mn, Ni, Co, Cr, V, and Fe, or two or more elements thereof are used at the same time. In this case, M and Me may be the same or different from each other.)

$0.8Li_2MnO_3·0.2Li_{0.3}Ni_{0.7}O_2$ was synthesized by the method illustrated in FIG. 3 by selecting a as 0.2, M1 as Mn, and Me as Ni in [Formula 5].

First, as precursors for a solid-phase reaction of $Li_2MnO_3$, $Li_2CO_3$ (Junsei, purity 99% or more) and $MnO_2$ (Alfa Aesar, purity 99% or more) were prepared as follows.

$$Li_2CO_3+0.5MnO_2$$

Specifically, a weight of each material prepared was 1 g of $Li_2CO_3$ and 1.178 g of $MnO_2$.

Also, as precursors for a solid-phase reaction of $Li_{0.3}Ni_{0.7}O$, $Li_2CO_3$ (Junsei, purity 99% or more) and $NiCO_3$ (Alfa Aesar, purity 99% or more) were prepared as follows.

$$0.15Li_2CO_3+0.7NiCO_3$$

Specifically, a weight of each material prepared was 0.132 g of $Li_2CO_3$ and 1 g of $NiCO_3$.

As described above, after the precursor of the $Li_2MnO_3$ and the precursor of the $Li_{0.3}Ni_{0.7}O$ were separately added to an acetone solvent, a uniformly mixed mixture was prepared while aggregated powder of the precursors was disintegrated by ball milling for about 12 hours. Zirconia balls having diameters of 3.5 mm and 10 mm were used for the ball milling.

After the powder was mixed by the ball milling, grinding was performed by high-energy ball milling, wherein, in this case, zirconia balls having a diameter of 1 mm were used for the ball milling.

After the powder was ground by the ball milling, the mixture was dried at a temperature of 100° C. or less in air using a hot plate, and the dried mixture was formed into pellets using a disc-shaped mold.

After the pellets thus prepared were put in an alumina crucible and subjected to a calcination process at 900° C. in an air atmosphere, the $Li_2MnO_3$ and the $Li_{0.3}Ni_{0.7}O_2$ were mixed in a ratio of 4:1, that is, $0.8Li_2MnO_3$ $0.2Li_{0.3}Ni_{0.7}O_2$, and ground by high-energy ball milling for about 2 hours 20 minutes, wherein, in this case, zirconia balls having a diameter of 1 mm were used for the ball milling.

After the powder was ground by the ball milling, the mixture was dried at a temperature of 100° C. or less in air using a hot plate, and the dried mixture was formed into pellets using a disc-shaped mold.

Thereafter, sintering (re-annealing) was performed at 800° C. for about 5 hours. In this case, a heating rate was 4° C./min and the sintered pellets were taken out from a furnace immediately after heating and subjected to a quenching process in air.

[Results of Analyzing Uniform Distribution of Elements: TEM-EDS Mapping]

Also, as confirmed in FIG. 5, it may be confirmed that a $LiNi_{0.5}Mn_{0.5}O_2$ phase and a $Li_2MnO_3$ phase were separately present in the typically synthesized Li-rich layered-structure composite oxide, but, since Li—Ni inter-diffusion was performed when the method according to the invention was used, it may be confirmed that the powder obtained according to Example 1 of the invention had a uniform Ni/Mn distribution while Ni was included in $Li_2MnO_3$. In the composition of $Li_{1.2}Ni_{0.2}Mn_{0.6}O_2$, Ni/Mn=0.33 and, with respect to the powder obtained according to Example 1, a ratio of Ni/Mn had a value deviating from 0.33 to 0.2 or less, but, with respect to a typical process, a distribution of the ratios exhibited a value of 0.5 or more.

[Local Structure Analysis Results: TEM-HAADF Image and Li-NMR Analysis]

In order to confirm a difference in local structures of the known composition $Li_{1.2}Ni_{0.2}Mn_{0.6}O_2$ prepared in Example 1 and the one synthesized by the typical synthesis method, HAADF images of a TEM were compared and presented in FIG. 6, wherein, in this case, HAADF images of the Li-rich layered structure ($Li_2MO_3$) in the Li-rich layered-structure composite oxide were compared. As a result, when synthesized by the method according to the invention, transition metals were present in a lithium layer, wherein cation disordering was increased in comparison to the typical synthesis method. Also, when a local distribution of lithium was confirmed by Li-NMR of FIG. 7, excess lithium was present only in $Li_2MnO_3$ by the typical process method, but, when synthesized by the method according to the invention, it may be confirmed that an excessive amount of lithium was included in the two layered structures $LiNi_{0.5}Mn_{0.5}O_2$ and $Li_2MnO_3$.

As a result, since a difference in the ratios of lithium in each layered structure was 0.42 by the typical method, excess lithium was present only in $Li_2MnO_3$, but, when synthesized by the method according to the invention, the difference in the ratios of lithium in each layered structure was 0.06, wherein it may be confirmed that the excessive amount of lithium was included in the two layered structures $LiNi_{0.5}Mn_{0.5}O_2$ and $Li_2MnO_3$.

[Charge and Discharge Characteristics Evaluation Results]

Figure 8:
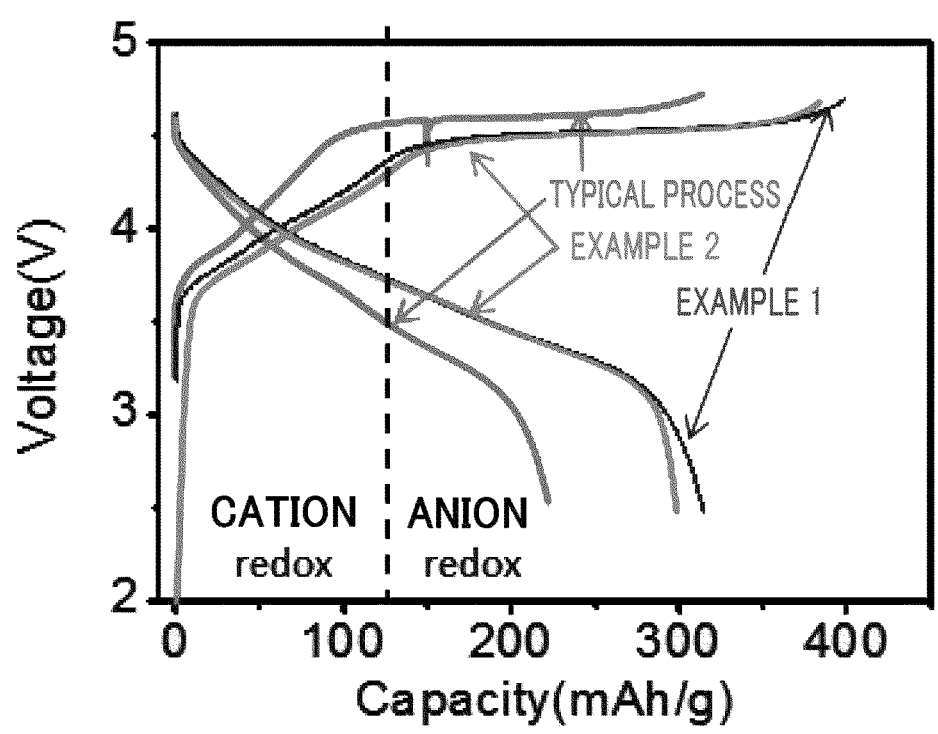
FIG. 8 illustrates results of evaluating charge and discharge characteristics of $Li_{1.2}Ni_{0.2}Mn_{0.6}O_2$ prepared according to Examples 1 and 2 of the invention.

FIG. 8 illustrates results of evaluating charge and discharge characteristics of the $Li_{1.2}Ni_{0.2}Mn_{0.6}O_2$ prepared according to Examples 1 and 2 of the invention.

In order to evaluate electrochemical behavior, electrodes were made from the $Li_{1.2}Ni_{0.2}Mn_{0.6}O_2$ materials prepared according to Examples 1 and 2 of the invention and electrochemical tests were performed.

After 80 wt % of $Li_{1.2}Ni_{0.2}Mn_{0.6}O_2$ as an active material, 15 wt % of super P as carbon powder, and 5 wt % of PVDF, as a binder, were put in a mortar, well mixed for 20 minutes to 30 minutes, and stirred for about 2 hours, an aluminum (Al) foil was well coated with the mixture, dried for 12 hours in a vacuum chamber, and then punched into a size of 1 mg to 3 mg to prepare a positive electrode, and the above process was performed in a glove box (argon atmosphere).

Cell assembly was performed using the positive electrode prepared as described above, wherein Celgard 2400 was cut to about 13 mm and used as a separator during the cell assembly, 1 M $LiPF_6$ in a solution, in which ethylene carbonate/dimethyl carbonate were mixed in a weight ratio of 1:1, was used as an electrolyte, and lithium metal was used as a negative electrode.

Electrochemical behavior of the cell prepared as described above was measured at room temperature. Maccor series 4000 was used as a measurement instrument, charging from 2.5 V to 4.7 V was first started during the measurement, and the measurement was made by applying a current of 14 mA/g at C/20 rate for both charge and discharge in a first cycle.

[Structure Analysis Results According to Temperature Change: In-Situ XRD Analysis]

Figure 9:
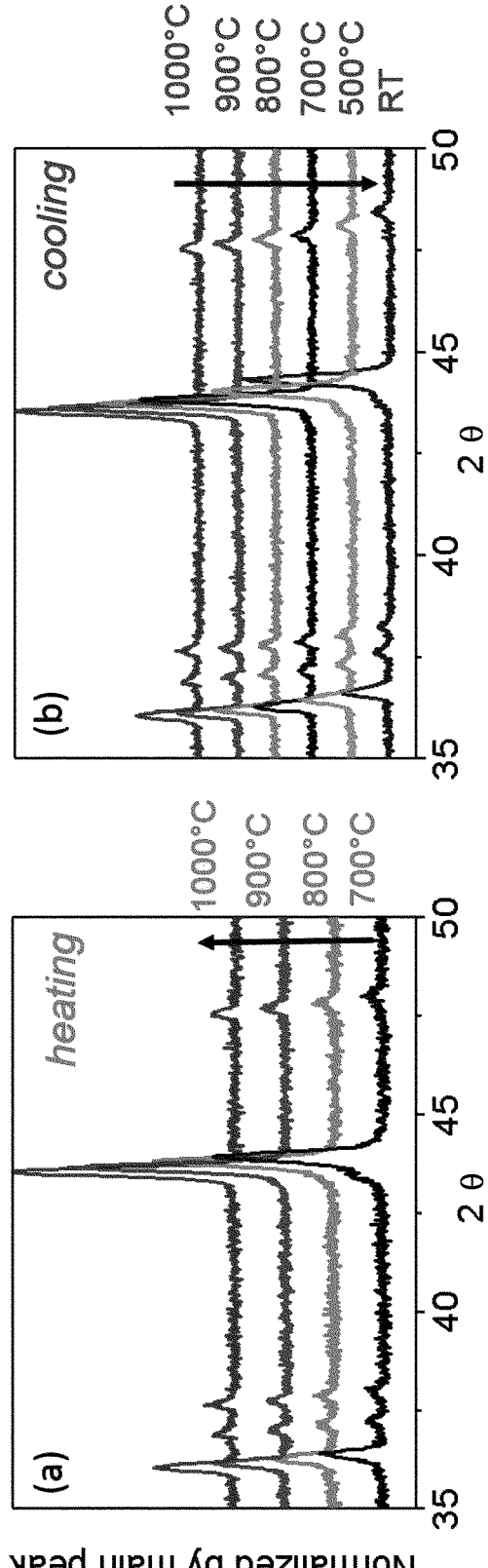
FIG. 9 illustrates results of comparing crystal structures of $Li_{1.2}Ni_{0.2}Mn_{0.6}O_2$ prepared according to Example 1 of the invention according to a temperature change.

Structures of $Li_{1.2}Ni_{0.2}Mn_{0.6}O_2$, as the known composition prepared in Example 1, according to a change in temperature were compared, and the results thereof are presented in FIG. 9. As shown in the figure, it may be seen that peaks from the two layered-structure phases were merged as the temperature increased, and it may be seen that the peaks were separated again as the temperature decreased again. In this case, a shape of the peaks merged at high temperature was a form in which cation disordering, a degree of random mixing of cations, was increased, and it may be understood through a change in intensity that, in a case in which rapid cooling was used when the two layered-structure phases were merged while reacting, it may be understood that cation disordering was increased.

In general, with respect to $LiMeO_2$, as a component constituting the Li-rich layered composite oxide, it is known that random mixing (disordering) of cations, that is, mixing of cations between the lithium layer and the transition metal layer is a phenomenon that appears well during synthesis.

However, with respect to the Li-rich layered material ($Li_2MO_3$) as another component, it is known that the random mixing (disordering) of cations is poorly formed.

Accordingly, in a reaction of deintercalating all lithium from the Li-rich layered composite oxide, since all lithium layers remain as vacancies to increase structural instability in the Li-rich layered material ($Li_2MO_3$), the deintercalation of all lithium is not possible when the typical synthesis method is used.

As confirmed in FIG. 8, changes in structures of the compositions of Examples 1 and 2 of the invention according to the temperature were confirmed by in-situ XRD while changing the temperature, and a phenomenon occurred in which peaks of the two layered-structure phases were merged as the temperature increased, wherein, in this case, it may be understood that intensity of the peak was changed in a form in which cation disordering was increased while the peaks were merged. In the method according to the invention, since the quenching process was performed at a temperature where the cation ordering was increased as described above, a material in a state in which the cation ordering was increased even at room temperature was obtained.

[Local Structure Analysis Results: Neutron Analysis]

It may be understood from FIG. 4 that cation disordering was increased in the Li-rich layered structure ($Li_2MO_3$) when the quenching was performed, and this means that rearrangement of elements occurred while the inter-diffusion of the elements occurred between the two layered-structure phases at high temperature.

Also, electrochemical activity of the layered-structure material may be significantly increased when the structure was changed due to the inter-diffusion of the elements in the layered structure.

Neutron refinement confirms that a new type of layered structure with increased cation disordering was produced in comparison to a case where a lattice parameter was typically synthesized.

Specifically, with respect to Example 1, values of $I(\sim66°)/I(\sim68°)$ and $I(\sim82°)/I(\sim83°)$ were 0.999 and 1.384, respectively, and, with respect to Example 2, values thereof were 0.993 and 1.297, respectively, wherein at least a portion of the neutron peaks appeared in a merged form so that they showed different results from 1.169 and 1.872 of the material synthesized by the typical process. That is, with respect to Examples 1 and 2 of the invention, it may be understood that the local structure was changed due to the inter-diffusion of the elements between the two layered-structures.

Furthermore, when the neutron or XRD refinement was performed, as in the results of the refinement of neutron data in FIG. 4, a degree of randomness of nickel present in the lithium layer in Examples 1 and 2, which were synthesized by the process according to the invention, had a value of 5% or more to 12% or less in both of the LNMO and $Li_2MnO_3$ phases present in $Li_{1.2}Ni_{0.2}Mn_{0.6}O_2$, but, when synthesized by the typical process, since a value of 4.8% was obtained in the LMNO phase and a value of 0% was obtained in the $Li_2MnO_3$ phase, it may be confirmed that there was no degree of randomness of cation in the $Li_2MnO_3$ phase.

Regarding the increase in anion electrochemical properties of the layered material having the structure according to the invention, it may be considered that this was due to the fact that, since the disordering of cations was structurally increased while the elements were rearranged, stability was increased in terms of entropy and, simultaneously, position and broadness of p-orbital energy of oxygen that may supply/accept electrons were affected as various types of elements were arranged around an oxygen ion, and this may also be understood by a change in lattice constant, TEM, and in-situ XRD.

In an embodiment of the invention, the quenching process means that, after a composite is heated in a furnace, the composite is taken out from the furnace and cooled in air, and the natural cooling process means that a composite is slowly cooled in a furnace.

Although the technical spirit of the invention has been described in conjunction with the accompanying drawings, this illustrates the preferred embodiments of the invention, but is not intended to limit the invention. Furthermore, it will be apparent to those skilled in the art that various modifications and imitations are possible within a range that does not depart from the scope of the technical spirit of the invention.

The invention claimed is:

1. A method of preparing a positive electrode active material for a lithium secondary battery, the method consisting essentially of:

mixing two or more metal precursors consisting essentially of lithium and at least one of transition metals selected from manganese (Mn), nickel (Ni), chromium (Cr), vanadium (V), and iron (Fe), forming pellets after ball milling the mixture, performing primary sintering of the mixed material, grinding the sintered material to reduce a particle size, performing secondary sintering at 700° C. to 1,000° C., and quenching the secondary sintered material at 800° C. to 1,000° C., and at a cooling rate of 500° C./min to 900° C./min, wherein the positive electrode active material for a lithium secondary battery is a composite represented by [Formula 1], wherein the composite consists essentially of two phases having a layered structure, inter-diffusion of lithium and transition metals is performed between the two phases having the layered structure, and a lithium excess region and a cation-disordered region, where distinction between a lithium layer and a transition metal layer is not clear, are formed in both of the two layered structures, $$aLi_{2-x}M1M2_yO_3 + bLi_{1+x'}M2_{(1-y')}O \qquad \text{[Formula 1]}$$

(wherein, $0 < a < 1$, $0 < b < 1$, $a+b=1$, $0.1 \leq x \leq 0.3$, $0.1 \leq x' \leq 0.3$, $0.1 \leq y \leq 0$ $0.3$, $0.1 \leq y' \leq 0.3$, $ax=bx'$, $ay=by'$, and each of M1 and M2 consists essentially of one or more elements independently selected from manganese (Mn), nickel (Ni), chromium (Cr), vanadium (V), and iron (Fe), and the composition satisfies electrical neutrality according to an amount of lithium and type and oxidation number of M1 and M2 which are inter-diffused between the two layered structures).

2. The method of claim 1, wherein the grinding is performed by at least one method selected from ball milling, water milling, air-jet milling, and roller milling.

3. The method of claim 1, wherein the primary sintering is performed at 800° C. to 1,000° C.

* * * * *